UNITED STATES PATENT OFFICE.

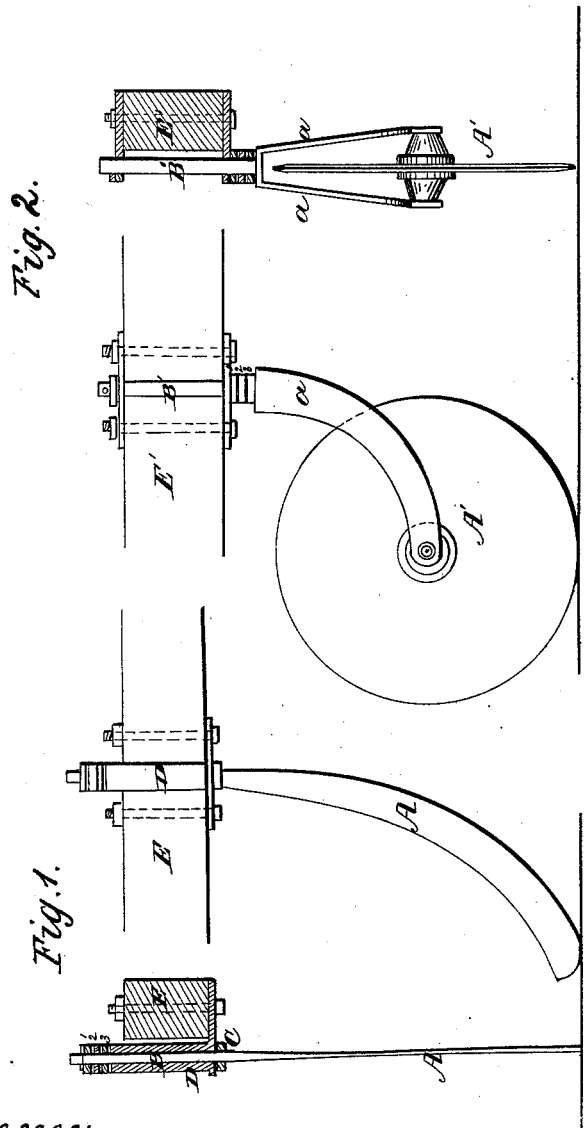

J. B. SKINNER, OF ROCKFORD, ILLINOIS.

IMPROVEMENT IN PLOWS.

Specification forming part of Letters Patent No. 57,200, dated August 14, 1866.

*To all whom it may concern:*

Be it known that I, JAMES B. SKINNER, of Rockford, Winnebago county, Illinois, have invented a new and useful Improvement in Plows, of which the following is a full, clear, and exact description, reference being had to the annexed drawings, making a part of this specification, in which—

Figure 1 represents my improvement applied to the colter of a plow, and Fig. 2 represents my invention as applied to a rotary cutter for plows.

In constructing plows it has hitherto been usual to employ rigid colters only, and then permitting the colter to have a vertical adjustment alone; and with plows so constructed it is inconvenient, tedious, and laborious to turn a square corner.

Now, it is the object of my invention to obviate these defects in plows having rigid colters; and to this end my invention consists in swiveling the colter in a socket or in adjustable brackets attached to the beam by slots and set-screws, and giving the colter a vertical adjustment by removable washers.

My invention is equally well adapted to the curved colter shown in Fig. 1, cutting with a convex edge, or to a rotary colter or cutter. (Shown in Fig. 2 in the drawings.) I have shown my invention applied to colters of both forms.

I form of iron or steel, or both combined, a colter, A, of the most approved form and curvature. Its edge, which should be of steel well tempered, must be formed on its convex side, and its shank, B, is made in the form of a spindle, with a collar, C, at the bottom, to rest against the bracket or socket D, by which it is secured to the beam E by screws, which pass through slots in the brackets and through the beam and are firmly held by nuts. The shank of the colter extends far enough through the socket or brackets, in which it has a free rotation, to receive a series of washers, 1, 2, and 3, above which a pin or nut may be used to hold the colter securely in the socket. The brackets or socket, it will be seen, can be adjusted to give the colter any desired position in relation to the beam, while the vertical adjustment of the colter can be varied at pleasure by changing the position of the washers from the top to the bottom of the shank; but however adjusted the colter will rotate freely in its collar or brackets.

The rotary cutter A' is supported in a caster-bracket, a, having its collar and shank B', with the latter supported in slotted brackets above and below the beam, and its washers 1', 2', and 3', shown at the bottom of the shank, which has a free rotation in the brackets, which are adjustable through their slots and the screw-bolts that hold them to the beam E'.

It will be manifest that the rotary motion of the shank and the vertical and side adjustments of both forms of my colters are identically the same, and the operation is such that while the colter is in the ground and the plow arrives at the end of its furrow the mere turning of the beam at right angles will cause the swiveled colter almost instantly to assume the new line of draft without any side dragging or without rendering it necessary to lift the colter from the ground while the team is turning a corner of the land being plowed; and this, it is manifest, is a vast economy of labor and time over the use of the rigid colter.

What I claim as my invention, and desire to secure by Letters Patent, is—

1. Swiveling the colter or cutter for plows or cultivators in sockets or brackets so attached to the beam as will permit the colter or cutter a lateral and vertical adjustment, substantially as and for the purpose set forth.

2. Giving the swiveled colter or cutter both a vertical and horizontal adjustment, substantially in the manner and for the purpose set forth.

In testimony whereof I have hereunto subscribed my name.

JAMES B. SKINNER.

Witnesses:
GEO. E. SKINNER,
HENRY M. SKINNER.